(12) United States Patent
Hirth et al.

(10) Patent No.: US 11,802,501 B2
(45) Date of Patent: Oct. 31, 2023

(54) EXHAUST GAS AFTERTREATMENT DEVICE

(71) Applicant: Vitesco Technologies GmbH, Regensburg (DE)

(72) Inventors: Peter Hirth, Munich (DE); Christian Schmidt, Munich (DE); Christian Schorn, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 17/780,316

(22) PCT Filed: Nov. 17, 2020

(86) PCT No.: PCT/EP2020/082362
§ 371 (c)(1),
(2) Date: May 26, 2022

(87) PCT Pub. No.: WO2021/104936
PCT Pub. Date: Jun. 3, 2021

(65) Prior Publication Data
US 2022/0412242 A1    Dec. 29, 2022

(30) Foreign Application Priority Data
Nov. 27, 2019  (DE) ..................... 10 2019 218 354.9

(51) Int. Cl.
*F01N 3/24*  (2006.01)
*F01N 3/20*  (2006.01)
*F01N 3/28*  (2006.01)

(52) U.S. Cl.
CPC ......... *F01N 3/2026* (2013.01); *F01N 3/2807* (2013.01); *F01N 3/2842* (2013.01); *F01N 2240/16* (2013.01)

(58) Field of Classification Search
CPC ...... F01N 3/027; F01N 3/2013; F01N 3/2026; F01N 2240/16
See application file for complete search history.

(56) References Cited

U.S. PATENT DOCUMENTS 5,140,813 A    8/1992  Whittenberger
5,224,335 A    7/1993  Yoshizaki
(Continued)

FOREIGN PATENT DOCUMENTS

CN    1680689    10/2005
DE    4434673    4/1996
(Continued)

OTHER PUBLICATIONS

International Search Report issued in corresponding PCT Application PCT/EP2020/082362.
(Continued)

*Primary Examiner* — Jonathan R Matthias
(74) *Attorney, Agent, or Firm* — Cozen O'Connor

(57) ABSTRACT

A device for treating exhaust gases of an internal combustion engine includes: a heating disk arranged in a housing; and a main catalytic converter arranged downstream of the heating disk in the flow direction in the housing. The flow can pass through the heating disk and the main catalytic converter in the flow direction along a plurality of flow channels. The heating disk is formed from a metallic honeycomb body and the main catalytic converter is formed from a ceramic honeycomb body fixed in relation to the housing by a fixing structure. The heating disk is electrically contacted by an electrical feedthrough guided through the housing from the outside to the inside.

6 Claims, 3 Drawing Sheets

(56) References Cited

U.S. PATENT DOCUMENTS

| | | | | |
|---|---|---|---|---|
| 5,254,840 A | * | 10/1993 | Thompson | F01N 3/027 |
| | | | | 428/116 |
| 5,525,309 A | * | 6/1996 | Breuer | F01N 13/0097 |
| | | | | 502/527.22 |
| 2005/0229590 A1 | * | 10/2005 | Bruck | B01F 23/2132 |
| | | | | 60/297 |
| 2008/0217315 A1 | * | 9/2008 | Bruck | B01J 35/04 |
| | | | | 422/174 |
| 2014/0165541 A1 | * | 6/2014 | Nagel | F01N 3/2842 |
| | | | | 422/171 |

FOREIGN PATENT DOCUMENTS

| | | |
|---|---|---|
| DE | 19602266 | 7/1997 |
| DE | 102009018182 | 10/2010 |
| DE | 102011110664 | 2/2013 |
| JP | H0754644 | 2/1995 |
| WO | WO 9213636 | 8/1992 |
| WO | WO 2004112433 | 12/2004 |

OTHER PUBLICATIONS

Written Opinion issued in corresponding PCT Application PCT/EP2020/082362.
Office Action issued in corresponding German Application No. 10 2019 218 354.9.

\* cited by examiner

EXHAUST GAS AFTERTREATMENT DEVICE

CROSS REFERENCE TO RELATED APPLICATIONS

This is a U.S. national stage of International application No. PCT/EP2020/082362, filed on Nov. 17, 2020, which claims priority to German Application No. 10 2019 218 354.9 filed Nov. 27, 2019, the content of each of which is incorporated herein by reference.

BACKGROUND OF THE INVENTION

1. Field of the Invention

The invention relates to a device for treating exhaust gases of an internal combustion engine.

2. Description of the Prior Art

Electrical heating devices, inter alia, are used to heat up the exhaust gas flowing in exhaust systems and the catalytic converters arranged in the exhaust system. For example, electrical heated catalytic converters which have a honeycomb body through which the exhaust gas can flow, and also a heating device, such as, for example, a heating conductor, are known. Such a heated catalytic converter or a heating disk is supported by suitable support means in relation to what is known as a support catalytic converter. A support catalytic converter may be, for example, an oxidation catalytic converter, an SCR catalytic converter or another catalytic converter suitable for exhaust gas aftertreatment. These main catalytic converters are regularly also formed by coated metallic honeycomb bodies.

A particular disadvantage of such devices with an electrical heated catalytic converter and support catalytic converters with metallic honeycomb bodies is that the two types of catalytic converters are electrically conductive. In order to prevent short circuits, the support means to which the honeycomb bodies are connected therefore has to have electrical insulation and thus have to electrically insulate the honeycomb bodies from one another. This makes the structure as a whole complicated and expensive.

SUMMARY OF THE INVENTION

It is therefore an object of the present invention to create a device which utilizes the advantages of a metallic heated catalytic converter and at the same time minimizes the disadvantages due to the need for additional electrical insulation.

In one aspect of the invention a device is provided for treating exhaust gases of an internal combustion engine, having a heating disk arranged in a housing and with a main catalytic converter arranged downstream of the heating disk in the flow direction in the housing, wherein the flow can pass through the heating disk and the main catalytic converter in the flow direction along a plurality of flow channels, wherein the heating disk is formed by a metallic honeycomb body and the main catalytic converter is formed from a ceramic honeycomb body which is fixed in relation to the housing by a fixing structure, such as, for example, a swellable mat or a supporting mat, wherein the heating disk is electrically contacted by an electrical feedthrough which is guided through the housing from the outside to the inside.

A housing can preferably be a casing tube into which the respective elements, such as the heating disk and the main catalytic converter, are inserted. The casing tube is part of the exhaust section and the exhaust gas can flow through it along a main throughflow direction.

The heating disk is preferably formed from a metallic honeycomb body which has a multiplicity of flow channels through which the flow can pass along a main throughflow direction. The main catalytic converter is advantageously made of a ceramic material and also has a plurality of flow channels through which the flow can pass. The main catalytic converter may be, for example, an oxidation catalytic converter, an SCR catalytic converter or another catalytic converter that is regularly used for exhaust gas aftertreatment. In particular, the coating of the ceramic and the material composition of the ceramic can be varied here for the corresponding application.

The fixing structure can preferably be formed by a swellable mat or a supporting mat. A swellable mat is a fiber fabric that is used to securely fix the ceramic honeycomb body in the casing tube. This includes, on the one hand, preventing a movement relative to the casing tube and, in addition, avoiding mechanical damage to the honeycomb body. This mat can be designed in such a way that its volume changes, in particular swells, in the course of the usual heat treatments and other processing methods, in order to enable secure fixing. Alternatively, suitably dimensioned supporting mats that do not undergo any change in volume can be used.

One or more electronic feedthroughs can be provided for the electrical contacting For this purpose, different concepts for the temperature-reliable and stable, durable feedthrough of electrical conductors are already known in the prior art.

It is particularly advantageous if the outside diameter of the heating disk is smaller than the inside diameter of the housing, with an annular air gap being formed between the housing and the heating disk. The air gap serves in particular to electrically insulate the heating disk in relation to the casing tube in order to thereby prevent short circuits and other unwanted current flows.

It is also advantageous if the heating disk is supported by a plurality of support pins in relation to the main catalytic converter and is spaced apart from the latter. Support pins can particularly preferably be made of metal or of a ceramic. Owing to the ceramic main catalytic converter, additional electrical insulation is unnecessary between the metallic heating disk and the main catalytic converter, which is connected to the casing tube. Therefore, expediently, the most suitable support pins for the individual purpose can be used. The support pins can be pressed into the heating disk and soldered thereto. The component created from the heating disk and support pins can then be inserted into the main catalytic converter. Alternatively, the support pins can also be fastened in the main catalytic converter first and the metallic heating disk pressed on afterward.

Depending on the choice of material, the support pins can, for example, be clamped, adhesively bonded, soldered or screwed to the main catalytic converter and/or the heating disk.

A preferred exemplary embodiment is characterized in that the heating disk is inserted into a ceramic half-shell.

A ceramic half-shell can in particular be a structure through which the flow can pass. This structure can be porous, for example, or also can have a multiplicity of openings permitting the flow to pass through. The half-shell can preferably be pot-shaped and can have a bottom region through which the flow can pass, and side walls running at least partially in the circumferential direction. For its part, the heating disk can be inserted into the ceramic half-shell or pressed into the latter.

The ceramic half-shell can extend over the entire cross section of the heating disk or can run under the heating disk just in the form of a strip-shaped web.

The heating disk can be connected to the ceramic half-shell, for example, via mandrels which are formed as part of the ceramic half-shell and engage in flow channels of the heating disk.

It is also preferable if the ceramic half-shell is fixed in relation to the housing by a fixing structure, such as a swellable mat or a supporting mat. The ceramic half-shell can also be supported by a swellable mat in relation to the casing tube. For this purpose, the casing tube preferably has receiving regions which serve to receive the fixing structure and the corresponding honeycomb body or the ceramic half-shell. The relative movement within the casing tube can be minimized by protrusions introduced in a targeted manner into the casing tube.

In addition, it is advantageous if the heating disk formed by a metallic honeycomb body is pressed into the ceramic half-shell. In particular, it is important that the ceramic half-shell does not block the flow of exhaust gases, for example by covering the flow channels of the heating disk. Therefore, the surface of the ceramic half-shell located on the gas outlet side of the heating disk preferably has a grid-like structure, which ideally has openings that are congruent with the flow channels of the heating disk.

The ceramic half-shell can, for example, have latching elements with which the heating disk is fixed in place after it has been pressed into the ceramic half-shell. An integrally bonded connection between the heating disk and the ceramic half-shell is also possible.

Furthermore, it is advantageous if one of the end faces of the honeycomb body of the main catalytic converter has a recess adapted to the shape of the heating disk, the heating disk being pressed into the recess in the honeycomb body. This is particularly advantageous in order to permit the heating disk to be integrated in the ceramic main catalytic converter. The recess can be produced directly during the shaping of the honeycomb body or subsequently by a machining process, for example milling.

Analogously to the ceramic half-shell, the flow channels of the heating disk should not be covered by the structure of the main catalytic converter. Ideally, the flow channels of the heating disk and of the main catalytic converter are congruent with one other.

The main catalytic converter can have mandrels which engage in individual flow channels of the heating disk for fixing purposes.

It is also expedient if the honeycomb body of the main catalytic converter has at least one bore running in the radial direction in the region of the recess, the electrical contacting of the heating disk being guided through this bore to the heating disk.

Such a bore is necessary for the feedthrough of the electrical conductor to the metallic heating disk. Depending on the number of electrical feedthroughs, a corresponding number of bores has to be provided on the honeycomb body of the main catalytic converter.

In addition, it is advantageous if support pins are guided through individual flow channels formed in the honeycomb body of the main catalytic converter from the gas inlet side to the gas outlet side of the honeycomb body. The support pins are advantageously fixed in relation to the gas inlet side and/or the gas outlet side.

Support pins which are guided completely along the flow channels through the ceramic honeycomb body of the main catalytic converter offer particularly high stability owing to the long guided section. They can be fixed in relation to the honeycomb body with screw connections or clamping plates, for example, which are attached to the gas inlet side and the gas outlet side.

In addition, it is advantageous if the support pins protrude beyond the gas inlet side of the honeycomb body of the main catalytic converter and the heating disk is pressed onto the protruding regions of the support pins.

In addition, it is preferable if the heating disk is supported by support pins in relation to a metallic honeycomb body serving as a support catalytic converter, the support catalytic converter being connected on its outer circumference to the inner surface of the housing. The heating disk is thus fixed in relation to the casing tube via the connection to the support catalytic converter. If the support pins for connecting the heating disk to the support catalytic converter are electrically conductive, it should be noted that an electrical current flow toward the casing tube is generated. This can be prevented with suitably insulated support pins.

Advantageous developments of the present invention are described in the dependent claims and in the description of the figures that follows.

BRIEF DESCRIPTION OF THE DRAWINGS

The invention will be explained in detail in the following text on the basis of exemplary embodiments with reference to the drawings. In the drawings.

DETAILED DESCRIPTION OF THE PRESENTLY PREFERRED EMBODIMENTS

Figure 1:
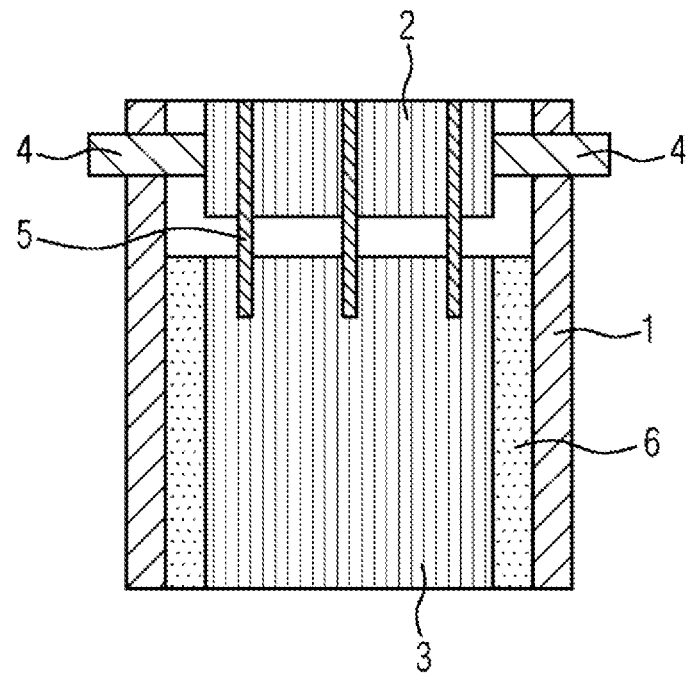
FIG. 1 shows a sectional view through a housing with a ceramic main catalytic converter, a metallic heating disk and with support pins which space the heating disk in relation to the main catalytic converter'

FIG. 1 shows a sectional view, in which a casing tube 1 serves as a housing, a heating disk 2, a main catalytic converter 3, an electrical feedthrough 4, and support pins 5 which space the heating disk 2 from the main catalytic converter 3 are shown.

The heating disk 2 is formed by a metallic honeycomb body. The main catalytic converter 3 is a ceramic honeycomb body, which can be coated with a suitable coating, for example, in accordance with its purpose. The main catalytic converter is fixed in relation to the casing tube 1 by a swellable mat 6. In addition to its fixing effect, the swellable mat 6 can also have an electrical insulating effect.

The electrical feedthrough 4, two electrical feedthroughs 4 are provided in the example in FIG. 1, is used for electrical contacting of the heating disk 2. For this purpose, the electrical feedthrough 4 forms a temperature-resistant electrical conductor guide that is electrically insulating in relation to the casing tube 1. The electrical feedthrough 4, which is formed by a sleeve for example, can preferably be welded to the casing tube 1.

The support pins 5 can be produced from a metallic material or from a ceramic material. The support pins 5 are preferably inserted into individual flow channels of the honeycomb bodies of the heating disk 2 and of the main catalytic converter 3. To further secure the connection, the support pins 5 can be soldered to the honeycomb bodies, for example. The core task of the support pins 5 is to fix the heating disk 2 within the casing tube 1 such that the electrically contacted heating disk 2 does not come into electrically conductive contact with the casing tube 1.

Figure 2:
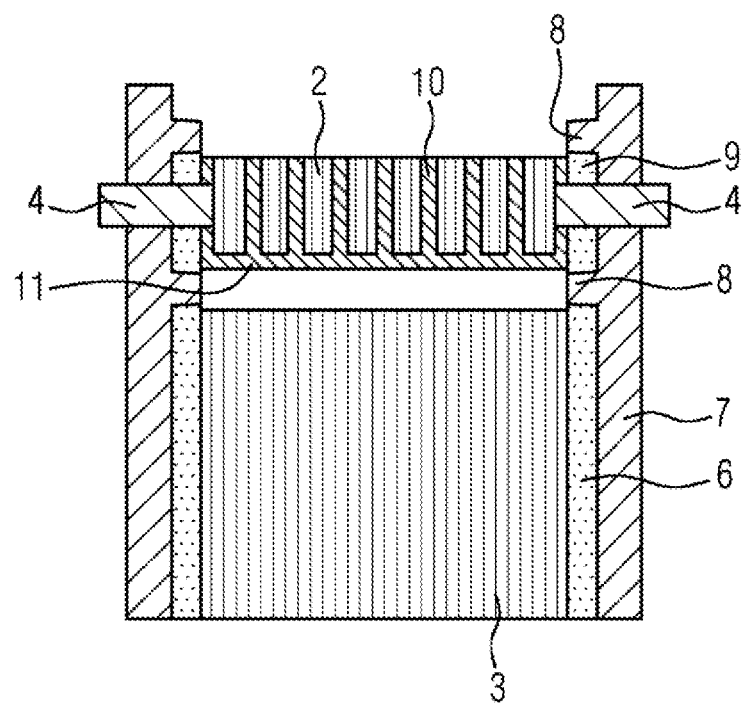
FIG. 2 shows a sectional view through a housing, with the heating disk being inserted into a ceramic half-shell spaced apart from the main catalytic converter.

FIG. 2 also shows an exhaust gas aftertreatment device. Identical parts are provided with the same reference signs from FIG. 1.

The main catalytic converter 3 is also supported in relation to the interior of the casing tube 7 using a swellable mat 6. The casing tube 7 has shoulders 8 on its inner surface, which are used for the axial fixing of the honeycomb bodies 3, 2 and the swellable mats 6, 9 used.

The shoulders can be arranged all the way around in the circumferential direction or only in sections.

The heating disk 2 is inserted into a ceramic half-shell 11. The heating disk 2 is fixed by mandrels 10 which can engage in individual flow channels of the heating disk 2 or can lie on the outer circumference of the heating disk 2. The heating disk 2 can form an interference fit with the ceramic half-shell 11, as a result of which it is fixed in the half-shell.

The ceramic half-shell 11 is fixed between the shoulders 8 by a second swellable mat 9. An air gap is formed between the heating disk 2 and the ceramic honeycomb body 3, as a result of which the two elements are spaced apart from one another in the axial direction.

The electrical feedthrough 4 is guided in the radial direction through the casing tube 7, the swellable mat 9 and optionally through the ceramic half-shell 11 in order to contact the heating disk 2.

Figure 3:
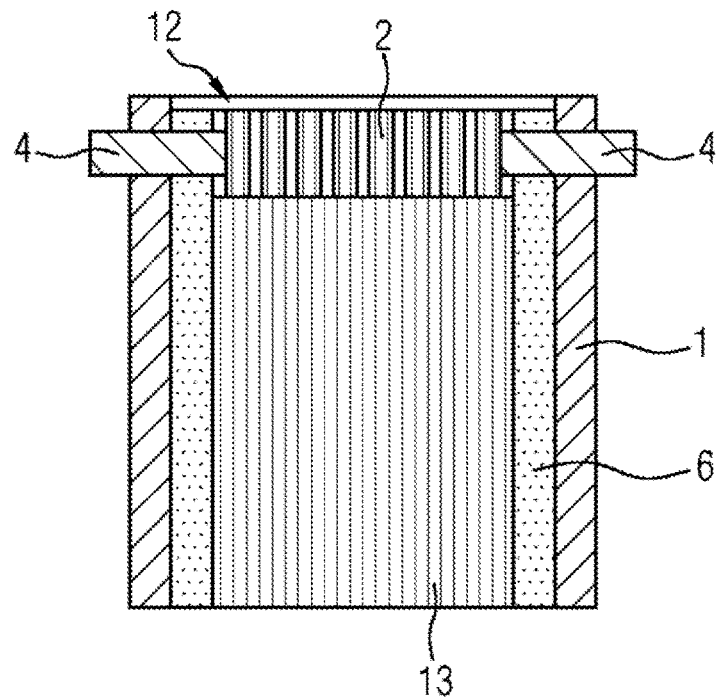
FIG. 3 shows a sectional view through a housing, with the heating disk being inserted into a recess on the end face of the main catalytic converter.

FIG. 3 shows an arrangement, wherein the heating disk 2 is inserted into a recess 12 in the ceramic honeycomb body 13. The honeycomb body 13 is supported in relation to the casing tube 1 by a swellable mat 6. The electrical feedthrough 4 is guided through the casing tube 1, the swellable mat 6, and the honeycomb body 13 to the heating disk 2.

The recess 12 is introduced into the honeycomb body 13 on the end side and can form an interference fit with the heating disk 2 or can have some other fixing structure for the heating disk 2 in the honeycomb body 13. As also in FIG. 2, mandrels which engage in the flow channels of the heating disk 2 can also be provided.

Figure 4:
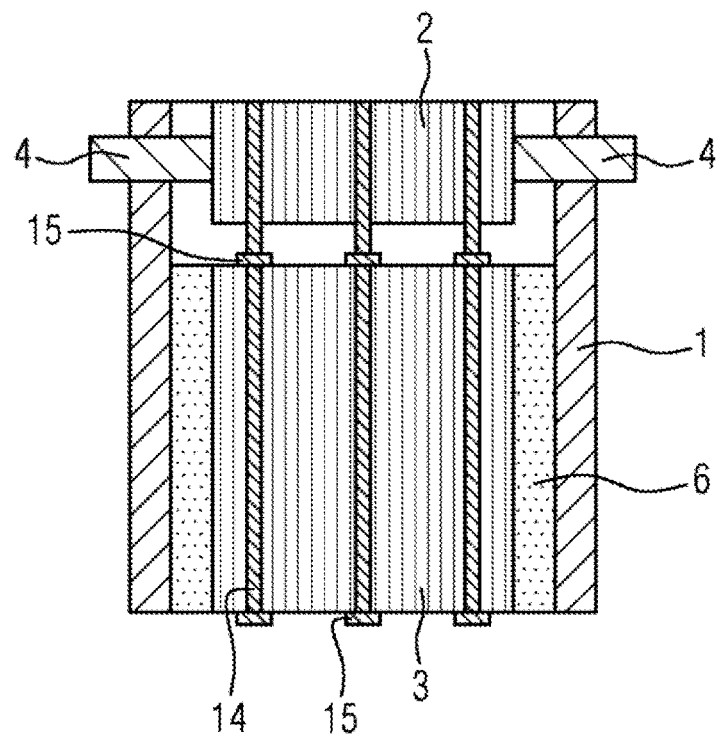
FIG. 4 shows a sectional view through a housing, with the heating disk being supported in relation to the main catalytic converter by support pins which are guided through the entire main catalytic converter.

FIG. 4 shows a structure with a ceramic honeycomb body 3, which is supported by a swellable mat 6 in relation to the casing tube 1. The heating disk 2 is electrically contacted by the electrical feedthrough or the feedthroughs 4.

In contrast to the preceding FIGS. 1 to 3, support pins 14 which are guided through the ceramic honeycomb body 3 are now shown here. The support pins 14 are guided along individual flow channels from the gas inlet side to the gas outlet side. The support pins 14 are fixed, for example screwed or clamped, in relation to the ceramic honeycomb body 3 with detents 15.

The heating disk 2 is then pressed onto the protruding end regions of the support pins 14 as a result of which the heating disk 2 is fixed at a distance from the ceramic honeycomb body 2 and from the inner wall of the casing tube 1.

Figure 5:
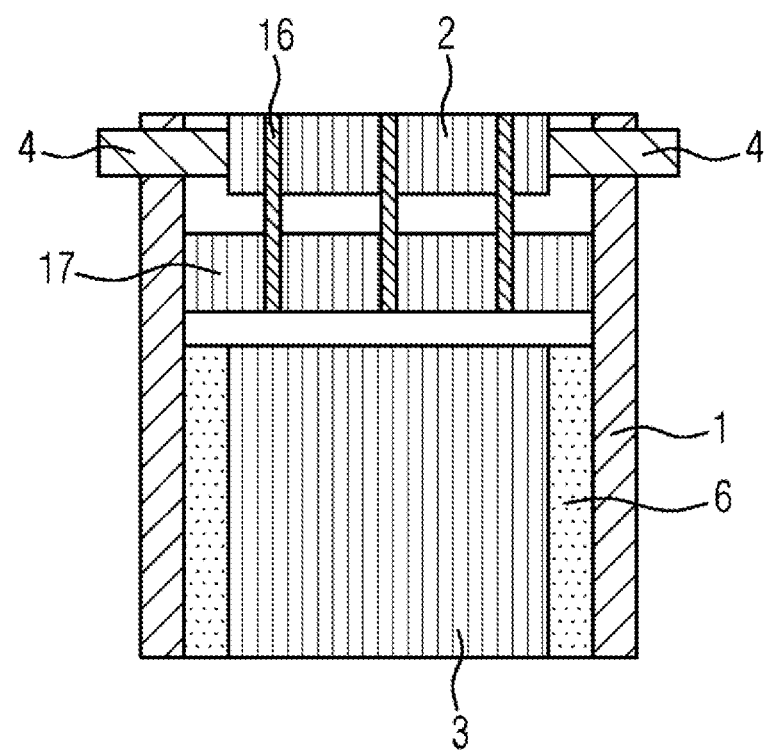
FIG. 5 shows a sectional view through a housing, with the heating disk being supported by support pins in relation to a support catalytic converter mounted upstream of the main catalytic converter.

FIG. 5 shows an embodiment with the ceramic honeycomb body 3, the swellable mat 6, the casing tube 1, the heating disk 2, and the electrical feedthroughs 4, as have already been shown in the previous Figures.

In contrast to the other embodiments, here the heating disk 2 is connected to a further metallic honeycomb body 17 by support pins 16. The further metallic honeycomb body 17 forms a so-called support catalytic converter. The support catalytic converter is used to fix the heating disk 2 inside the casing tube 1.

The support catalytic converter 17 has a larger diameter than the heating disk 2 and is in particular of such a size that it can be supported against the inner wall of the casing tube 1.

The heating disk 2 is spaced apart in the axial direction from the support catalytic converter 17 and the latter in turn is spaced apart from the ceramic honeycomb body 3. The support catalytic converter can, for example, be soldered to the casing tube in order to ensure secure fixing.

The different features of the individual exemplary embodiments may also be combined with one another.

The exemplary embodiments of FIGS. 1 to 5, in particular, have no limiting character and serve to illustrate the concept of the invention.

Although exemplary embodiments are explained in the above description, it should be noted that numerous modifications are possible. It should moreover be pointed out that the exemplary embodiments are merely examples which are not intended to limit the scope of protection, the applications and the structure in any way. Instead, the above description gives a person skilled in the art a guideline for the implementation of at least one exemplary embodiment, wherein various changes may be made, especially with regard to the function and arrangement of the integral parts described, without departing from the scope of protection as it is apparent from the claims and combinations of features equivalent thereto.

The invention claimed is:

1. A device for treating exhaust gases of an internal combustion engine, comprising:
   a heating disk arranged in a housing;
   a main catalytic converter arranged downstream of the heating disk in the flow direction in the housing;
   wherein the flow can pass through the heating disk and the main catalytic converter in the flow direction along a plurality of flow channels;
   wherein the heating disk is formed from a metallic honeycomb body and the main catalytic converter is formed from a ceramic honeycomb body fixed in relation to the housing by a swellable mat;
   wherein the heating disk is electrically contacted by an electrical feedthrough guided through the housing from the outside to the inside; and
   wherein the heating disk is supported by a plurality of support pins in relation to the main catalytic converter and is spaced apart from the latter.

2. The device as claimed in claim 1, wherein the outside diameter of the heating disk is smaller than the inside diameter of the housing, with an annular air gap being formed between the housing and the heating disk.

3. The device as claimed in claim 1, wherein the support pins are fixed in relation to the gas inlet side and/or the gas outlet side.

4. The device as claimed in claim 3, wherein the support pins protrude beyond the gas inlet side of the honeycomb body of the main catalytic converter and the heating disk is pressed onto the protruding regions of the support pins.

5. The device as claimed in claim 1, wherein the heating disk is supported by support pins in relation to a metallic honeycomb body serving as a support catalytic converter, the support catalytic converter being connected on its outer circumference to the inner surface of the housing.

6. A device for treating exhaust gases of an internal combustion engine, comprising:
   a heating disk arranged in a housing;
   a main catalytic converter arranged downstream of the heating disk in the flow direction in the housing;
   wherein the flow can pass through the heating disk and the main catalytic converter in the flow direction along a plurality of flow channels;
   wherein the heating disk is formed from a metallic honeycomb body and the main catalytic converter is formed from a ceramic honeycomb body fixed in relation to the housing by a swellable mat;
   wherein the heating disk is electrically contacted by an electrical feedthrough guided through the housing from the outside to the inside; and
   wherein support pins are guided through individual flow channels formed in the honeycomb body of the main catalytic converter from the gas inlet side to the gas outlet side of the honeycomb body.

* * * * *